United States Patent [19]
Arato et al.

[11] Patent Number: 5,589,652
[45] Date of Patent: Dec. 31, 1996

[54] CERAMIC-PARTICLE-DISPERSED METALLIC MEMBER, MANUFACTURING METHOD OF SAME AND USE OF SAME

[75] Inventors: Toshiaki Arato, Katsuta; Yasuhisa Aono, Hitachi; Shigeo Tsuruoka, Hitachi; Katsuhiro Komuro, Hitachi, all of Japan

[73] Assignee: Hitachi, Ltd., Tokyo, Japan

[21] Appl. No.: 200,731

[22] Filed: Feb. 23, 1994

[30] Foreign Application Priority Data

Mar. 18, 1993 [JP] Japan .................................. 5-058335

[51] Int. Cl.$^6$ ........................................................ C22C 9/00
[52] U.S. Cl. ................... 75/235; 75/231; 75/239; 75/243; 75/246; 75/247; 75/249; 419/12; 419/13; 419/14; 419/24; 419/48
[58] Field of Search .................. 75/239, 243, 235, 75/246, 247, 249, 231; 419/48, 9, 24, 12–14

[56] References Cited

U.S. PATENT DOCUMENTS 3,981,062  9/1976  Moskowitz et al. ................. 75/231
4,661,154  4/1987  Faure ..................................... 75/231
4,722,751  2/1988  Akechi et al. ........................ 75/232
4,961,779  10/1990  Kusui et al. ......................... 75/231
5,128,213  7/1992  Tanaka et al. ..................... 428/552
5,217,814  6/1993  Kawakami et al. ............... 428/545
5,303,617  4/1994  Asada et al. ........................ 75/231

FOREIGN PATENT DOCUMENTS 0191707  8/1986  European Pat. Off. .
0367229  5/1990  European Pat. Off. .
1122498  8/1968  United Kingdom .

OTHER PUBLICATIONS

Patent Abstracts of Japan, vol. 12, No. 312, 24 Aug. 1988.
Ann. Rev. Mater. Sci., vol. 13, 1983, Paulo Alto, USA, pp. 279–300, Gilman and Benjamin, 'Mechanical Alloying'.

Primary Examiner—Ngoclan Mai
Attorney, Agent, or Firm—Antonelli, Terry, Stout & Kraus

[57] ABSTRACT

In the metallic member of the invention, ceramic super fine particles, and solid lubricant particles or short size fibers are dispersed, and the grain size of the ceramic particles is smaller than the solid lubricant particle size or fiber diameter.

18 Claims, 10 Drawing Sheets

CERAMIC-PARTICLE-DISPERSED METALLIC MEMBER, MANUFACTURING METHOD OF SAME AND USE OF SAME

FIELD OF THE INVENTION

The present invention relates to a metallic member, especially, aluminum, ferrous and copper alloys, having one or more of high electric conductivity, high thermal conductivity, heat resistance and wear resistance, in which super fine ceramic particles and solid lubricant particles or solid lubricant short size fibers, especially, graphite whiskers, are dispersed, and is more particularly concerned with a nitride dispersion strengthening copper alloy, a nitride dispersed aluminum alloy and a nitride dispersion strengthened iron which are suitable for use in electro-conductive, heat-resistant strengthened members such as sliding contact members and electric contacts, a manufacturing method thereof, and use thereof.

TECHNICAL BACKGROUND

For the purpose of utilizing advantageous basic characteristics of copper, i.e., high electric conductivity and high thermal conductivity, in various industrial products, many copper alloys improved to overcome a weak point of copper, i.e., a deficiency in strength, have been manufactured. As methods for strengthening copper, known hitherto are a method of adding one or more of elements having less solubility into matrix, such as Zr, Cr, Cd and Be, to develop precipitation hardening by aging treatment, and a method of dispersing ceramic particles, which are hard to react with a copper matrix phase, into the matrix phase. The strengthening is effected by precipitates or ceramic particles which are finely dispersed in the mother phase and prevent dislocation movement responsible for a plastic deformation. The former strengthening method is disclosed in JP-A-57-9850. Of the latter strengthening method, oxide-dispersion-hardening is disclosed in JP-A-2-213433, carbide-dispersion-hardening in JP-A-1-96338, and nitride-dispersion-hardening in JP-A-60-208402, etc.

Meanwhile, addition of graphite powder or BN powder improves lubrication property, low contact resistance and seizure resistance of copper alloys. A method for manufacturing such copper alloys is disclosed in, for example, JP-A-57-123943. Addition of graphite powder is practiced to manufacture copper alloys for electric contacts, aiming at an improvement in low contact resistance and seizure resistance, and is disclosed in JP-A-62-284031.

The aforesaid precipitation-hardening copper alloy can keep the strength at temperatures of about 400° C. or below, but loses its hardening ability at temperatures higher than 400° C. due to pyrolysis of precipitates.

On the other hand, as dispersing methods used to manufacture a ceramic dispersion strengthening copper alloy, known hitherto are an oxide dispersion strengthening method using a powder mixing process or an internal oxidation process, and a mechanical alloying process adapted for a mixture of copper and fine ceramic powders as disclosed in JP-A-3-2338, JP-A-2-213433 and JP-A-63-83240. For the fine dispersion of ceramic particles, the internal oxidation process and the mechanical alloying process are superior. As methods for manufacturing members made of strengthening copper alloys, there has been utilized powder metallurgical methods such as thermal extrusion.

Taking copper as an example, if impurities are present in copper, those impurities cause scattering of conduction electrons, thereby deteriorating high electric conductivity and high thermal conductivity both inherent to copper. Strength of copper members is required to be increased for enabling them to be widely used as practical materials for industrial purposes, but any methods of strengthening copper by alloying necessarily deteriorate the above inherent characteristics. In a precipitation-hardening copper alloy, particularly, besides a limit in the application temperature as mentioned before, electron scattering occurs due to strains of lattices around the precipitates and changes in electron states around a trace amount of residual metallic solute atoms, making it very difficult to expect high electric conductivity and high thermal conductivity comparable to those of pure copper.

Although increasing the strength of copper while maintaining excellent characteristics thereof is quite difficult, an optimum method for solving this problem is the above-mentioned method of dispersing ceramic particles which are less reactive with copper.

$Al_2O_3$ has been most widely employed as dispersion strengthening particles for copper, and an $Al_2O_3$ dispersion strengthened copper alloy has been manufactured for commercial marketing. Of methods for manufacturing that strengthened copper alloy, however, an internal oxidation process of a polycrystalline powder of a copper-aluminum low alloy has the problem of deteriorating the strength at high temperatures because coarse $Al_2O_3$ are formed at grain boundaries.

On the other hand, an $Al_2O_3$ dispersion strengthened copper alloy manufactured by a step of mechanical alloying of mixture of copper powder and fine $Al_2O_3$ powder, or steps of mechanical alloying to mixture of fine copper oxide powder and fine $Al_2O_3$ powder and reducing it, and a subsequent step of sintering the alloy exhibits the superior strength. However, increasing the amount of $Al_2O_3$ added to enhance the strength leads to an increase in the content of copper oxide in the copper matrix phase, thus resulting in deterioration of electric conductivity and thermal conductivity. This phenomenon occurs in common to those alloys using ceramic oxides as dispersion powder. As to the reasons, it is believed that during sintering of copper particles and oxide particles, an reaction occurs at contact interface therebetween to form thin copper oxide films on the copper particles, and deformations developed with progress of the sintering cause exfoliation and dispersion of the copper oxide. In the case of utilizing an oxide dispersed copper alloy as a stabilizer for metallic superconductor coils, especially, care must be paid so as to maintain a high degree of purity of copper matrix phase.

Further, during reducing heat treatment in which a large amount of copper oxide and $Al_2O_3$ particles after the mechanical alloying are reduced at temperatures of 1065° C. or below in the above manufacturing steps, the treatment temperature is hard to control because of an exothermic reaction between hydrogen and the copper oxide, making it very difficult to determine whether reduction from the copper oxide to copper has been completed or not over the entirety of powder. If the reducing reaction is incomplete, the content of oxygen remaining in the matrix would be increased, with the result of deteriorating the excellent characteristics of copper.

Ceramic dispersion particles are more or less bonded to the matrix phase, and impurities in the ceramic dispersion particles penetrate into the matrix phase during the mechanical alloying and through the interface reaction during the sintering, thereby contaminating the matrix phase. Accordingly, utilization of high purity ceramic particles is desired. It can be also said that a copper alloy in which are dispersed those ceramic particles having at least one of excellent copper characteristics, i.e., high electric and high thermal conductivities, and being hard to react with copper, is suitable as the ceramic dispersion strengthening copper alloy.

Meanwhile, in conventional copper alloys for use as wear-resistant materials, graphite or BN having superior lubrication property has been generally added. In view of practical application of graphite to electric contacts, especially, it is believed that wear-resistant contact materials exhibiting superior characteristics to conventional copper alloys can be developed by using such graphite as having excellent strength and thermal properties.

SUMMARY OF THE INVENTION

With a view of overcoming the above-mentioned problems in prior art strengthened copper, aluminum and ferrous alloys, and problems in prior art oxide dispersion strengthened copper alloys, an objective of the present invention resides in providing a metallic member having wear resistance and high strength such as suitable for use in resistance electrodes, sliding contact members, electric contacts, a manufacturing method thereof, and use thereof.

The present invention relates to a ceramic-particle-dispersed metallic member in which ceramic super fine particles and solid lubricant particles or solid lubricant short size fibers are dispersed, wherein the mean grain size of the ceramic super fine particles is smaller than the mean grain size of the solid lubricant particles or the mean diameter of the short size fibers, the metallic member being of a sintered body.

Also, the present invention relates to the ceramic-particle-dispersed metallic member, wherein the mean grain size of the ceramic super fine particles is not more than 200 nm, and the means grain size of the solid lubricant particles or the mean diameter of the short size fibers is in the range of 0.25 to 10 μm, the metallic member being of a sintered body.

Further, the present invention relates to the ceramic-particle-dispersed metallic member, wherein the mean grain size of the ceramic super fine particles is not more than 200 nm, and a region where the ceramic super fine particles are dispersed not less than 500 in number per section area of one square micrometer is formed substantially over the entirety region of the metallic member.

Still further, the present invention relates to the ceramic-particle-dispersed metallic member, wherein the ceramic super fine particles have the content not more than 1 wt % and the mean grain size not more than 200 nm, and a region where the ceramic super fine particles are dispersed not less than 500 in number per section area of one square micrometer at 1 wt % is formed substantially over the entirety region of the metallic member.

Still further, the present invention relates to the ceramic-particle-dispersed metallic member, wherein the ceramic super fine particles have the content not more than 1 wt % and the mean grain size not more than 200 nm, and a region where the ceramic super fine particles are dispersed not less than 500 in number per section area of one square micrometer is formed substantially over the entirety region of the metallic member.

Still further, the present invention relates to the ceramic-particle-dispersed metallic member, wherein the ceramic super fine particles have the content not more than 1 wt % and the mean grain size not more than 200 nm, and when a relationship between the content (wt %) and the mean particle spacing (nm) of the ceramic super fine particles is plotted in a logarithmic scale, the relationship is distributed within the rectangular region defined by straight lines interconnecting a point A (0.01%; 20 nm), a point B (0.01%; 500 nm), a point C (1.0%; 50 nm) and a point D (1.0%; 2 nm).

Still further, the present invention relates to the ceramic-particle-dispersed metallic member wherein ceramic super fine particles and graphite whiskers are dispersed in copper, aluminum or iron, and the metallic member is of a sintered body.

The present invention is also effective in the following forms relating to combinations of matrix materials and ceramic particles, besides the above metallic members.

1) A high purity or heat-resistant nitride dispersion strengthening copper alloy consisting of a matrix made of one selected from the group of high purity copper, copper, high thermal-conductive copper containing graphite whiskers, and a copper alloy, and one or two kinds of ceramic particles dispersed in matrix phase to improve the strength of the matrix for providing the higher strength. A grain size distribution of the dispersed ceramic particles is preferably 0.001 μm to 0.2 μm. Also, preferably, high thermal-conductive hexagonal-BN (h-BN) particles not more than 1 wt % are dispersed in copper matrix.

2) A heat-resistant nitride dispersion strengthening copper alloy consisting of, by weight, one or two of high thermal-conductive AlN particles and high thermal-conductive h-BN particles: 0.2 to 1.0%, preferably 0.05 to 0.2%, which are dispersed in a particulate state with a grain size distribution ranging from 0.001 μm to 0.2 μm, and the balance of copper and unavoidable impurities not more than 0.05%.

3) A heat-resistant nitride dispersion strengthening copper alloy consisting of, by weight, graphite whiskers: 1.0 to 10.0%, one or two of high thermal-conductive AlN particles and high thermal-conductive h-BN particles: 0.05 to 0.2%, which are dispersed in a particulate state with a grain size distribution ranging from 0.001 μm to 0.2 μm, and the balance of copper and unavoidable impurities.

4) A heat-resistant nitride dispersion strengthening copper alloy consisting of, by weight, one of Al: 0.13% or below and Mg: 0.09% or below, these additive elements being present in the form of metal oxides, one or two of high thermal-conductive AlN particles and high thermal-conductive h-BN particles: 0.2 to 1.0%, which are dispersed in a particulate state with a grain size distribution ranging from 0.001 μm to 0.2 μm, and the balance of copper and unavoidable impurities.

5) A heat-resistant nitride dispersion strengthening copper alloy consisting of, by weight, high thermal-conductive h-BN particles: 0.01 to 1.0%, which are dispersed in a particulate state with a grain size distribution ranging from 0.001 μm to 0.2 μm, and the balance of copper and unavoidable impurities.

The present invention is further effective in the case of containing ceramic super fine particles alone.

In addition, the present invention relates to a method for manufacturing ceramic-particle-dispersed metallic powder wherein metallic powder, ceramic powder, and solid lubricant powder or solid lubricant short size fibers are put in a ceramic container along with ceramic balls, and the ceramic container is rotated at a high rotational speed for a rotation time enough to produce a pressing force sufficient to plastically deform the metal powder by a centrifugal force of the ceramic balls, and also enough to uniformly disperse the ceramic powder and the solid lubricant powder or the solid lubricant short size fibers into the metal powder by causing the metal powder to grow to the desired grain size larger than the original grain size thereof.

The practical manufacturing method of the present invention is as follows.

Mixed powder of copper powder and one or two of high thermal-conductive AlN particles and high thermal-conductive h-BN particles is mechanically alloyed by using a high energy ball mill to disperse one or two of the high thermal-conductive AlN particles and the high thermal-conductive h-BN particles in copper matrix phase with a grain size distribution ranging from 0.001 μm to 0.2 μm. The mechanical alloying by the ball mill is performed by keeping a ball mill container made of ceramic or having at least its inner wall made of copper, in which the mixed powder and ceramic ball are put, in the temperature range of 100° C. to 200° C., simultaneously de-gassing the interior of the container to provide a pressure of $10^{-2}$ to $10^{-3}$ torr, then replacing the container atmosphere with high purity Ar gas 99.9 wt % or more or equivalent $N_2$ gas under 1 atm. pressure, and thereafter effecting the alloying process at 200 to 400 rpm in rotational speed at about the room temperature for 15 to 30 hours for the BN particles or 30 to 50 hours for other particles. Finally, the alloyed powder is preferably annealed and purified in a stream of high purity hydrogen gas 99.99 wt % or more. Also, preferably, the purity of the copper powder before starting the mechanical alloying is 99.0 to 99.9 wt % and the mean grain size thereof is not more than 200 μm. Further, preferably, the mean grain size of the high thermal-conductive AlN particles and the high thermal-conductive h-BN particles before starting the mechanical alloying is not more than 0.1 μm, the purity thereof is 99.2 wt % or more, and the thermal conductivity of powder particles in the form of a sintered body is not less than 150 W/m·K for the AlN particles and not less than 50 W/m·K for the BN particles.

Alternatively, the heat-resistant nitride dispersion strengthening copper powder of the present invention is manufactured in such a manner that mixed powder of copper powder, graphite whiskers and one or two of high thermal-conductive AlN particles and high thermal-conductive h-BN particles is mechanically alloyed by using a high energy ball mill to disperse one or two of the high thermal-conductive AlN particles and the high thermal-conductive h-BN particles in copper matrix phase with a grain size distribution ranging from 0.001 μm to 0.2 μm. The mechanical alloying by the ball mill is performed similarly to the above method. Preferably, the thermal conductivity of the graphite whiskers before starting the mechanical alloying is not less than 1000 W/m·K, and the size thereof 0.3 μm to 2 μm in diameter and 1 μm to 100 μm in length.

Alternatively, the heat-resistant nitride dispersion strengthening copper powder of the present invention is manufactured in such a manner that mixed powder of one of Cu—Al and Cu—Mg low alloy powder and one or two of high thermal-conductive AlN particles and high thermal-conductive h-BN particles is mechanically alloyed by using a high energy ball mill to disperse one or two of the high thermal-conductive AlN particles and the high thermal-conductive h-BN particles in copper matrix phase with a grain size distribution ranging from 0.001 μm to 0.2 μm. The mechanical alloying by the ball mill is performed similarly to the above method.

In addition, the present invention relates to a method for manufacturing ceramic-particle-dispersed metallic powder comprising the first step of mechanical alloying metallic raw material powder and ceramic powder to produce metallic powder in which the ceramic particles are dispersed, and the second step of mechanical alloying the metallic powder in which the ceramic particles are dispersed and solid lubricant powder or solid lubricant short size fibers.

As an alternative, the present invention relates to a method for manufacturing ceramic-particle-dispersed metallic powder comprising a first step of mechanically alloying metallic powder and solid lubricant powder or solid lubricant short size fibers, and a second step of mechanical alloying the metallic powdery produced by the first step and ceramic powder.

Further, the present invention relates to ceramic-particle-dispersed composite metallic powder in which ceramic super fine particles and solid lubricant particles or solid lubricant short size fibers are embedded in metallic powder, wherein the composite metallic powder contains the particles not less than 40 wt % of which grain size is not less than 60 μm.

The ceramic-particle-dispersed metallic powder according to the present invention can be manufactured by any of the above-mentioned methods, and is provided as satisfying the essential requirements for the metallic members mentioned before.

Further, the present invention relates to a ceramic-particle-dispersed metallic member which is manufactured by sintering the ceramic-particle-dispersed metallic powder at a high temperature under a pressure.

The practical sintering process is carried out as follows.

Thus, the manufacturing method of the invention comprises a step of mechanical alloying mixed powder of metallic powder, ceramic powder and solid lubricant particles or solid lubricant short size fibers, more preferably mixed powder of a matrix powder made of high purity copper, copper, high thermal-conductive copper containing graphite whiskers or a copper alloy, and one or two of high thermal-conductive AlN particles and high thermal-conductive h-BN particles, or a step including the above step and a purifying process for the alloyed powder; a step of filling the mechanically alloyed powder in a metallic container; a step of de-gassing the interior of the container and then sealing up it; a step of sintering the sealed-up powder by applying predetermined plastic deformations under a hot hydrostatic pressure or by thermal extrusion; and a step of carrying out final heat treatment or working. According to the above method, a metallic member having superior characteristics such as high electric conductivity, high thermal conductivity, heat resistance, wear resistance and neutron irradiation resistance, can be manufactured.

Primary uses of the metallic member obtained by the above manufacturing method are as follows.

The present invention is of a fluid processing apparatus in which a plurality of through holes are formed in a cylinder block which is fixed to a rotary shaft supported by a stationary member, a cylinder head is disposed to enclose an open end face of the cylinder block, pistons are disposed at one ends respectively in the through holes of the cylinder block, the other ends of the pistons are pivotably held by a rotary plate disposed to face the cylinder block, spacers are disposed to support the rotary plate for driving the pistons, and the cylinder block is rotated to reciprocally move the pistons for sucking, compressing and delivering a working fluid, wherein the cylinder block and the rotary plate are each made of an aluminum base alloy in which ceramic super fine particles, and solid lubricant particles or solid lubricant short size fibers are dispersed.

The invention is of also a compressor comprising a wobble plate fixed to a rotary shaft and a piston reciprocally moving through a sliding member with rotation of the wobble plate, wherein at least one of the wobble plate, the sliding member and the piston is made of a copper base sintered alloy in which ceramic super fine particles, and solid lubricant particles or solid lubricant short size fibers are dispersed.

The invention is of also a vacuum circuit breaker comprising a fixed electrode, a movable electrode disposed to be able to approach or to move away from the fixed electrode in opposite relation, and an insulating case containing both the electrodes under vacuum, wherein both the electrodes are each made of a copper base sintered alloy in which ceramic super fine particles, and solid lubricant particles or solid lubricant short size fibers are dispersed.

The present invention relates to a pantograph contact strip made of an aluminium base sintered alloy in which ceramic super fine particles, and solid lubricant particles or solid lubricant short size fibers are dispersed.

Practical combinations of the composition and use of the metallic member according to the present invention are as follows.

The invention is of a heat-resistant spot welding electrode which is formed of a nitride dispersion strengthening copper alloy consisting of matrix made of one of copper and a copper alloy, and one or two of high thermal-conductive AlN particles and high thermal-conductive h-BN particles dispersed in the matrix phase to increase heat resistance of the matrix, and is of also a spot welder using the electrode.

Further, the invention is of wear-resistant materials for sliding contact members and electric contact materials which are formed of a nitride dispersion strengthening copper alloy consisting of copper or a copper alloy, high thermal-conductive graphite whiskers, and one or two of high thermal-conductive AlN particles and high thermal-conductive h-BN particles.

Still further, the invention is of a circuit breaker or switch for use in vacuum or air of which electrode members are formed of a nitride dispersion strengthening copper alloy consisting of high thermal-conductive graphite whiskers, and one or two of high thermal-conductive AlN particles and high thermal-conductive h-BN particles dispersed to increase heat resistance and depositing resistance.

Metallic powder subjected to alloying in the present invention can be obtained by the following method. Thus, high purity metallic powder is preferably manufactured by preparing a high purity metal and a high purity alloy as raw fine powder materials, using an image furnace or a laser beam as a heat source for melting a high purity metal wire and a high purity alloy wire both continuously supplied, and jetting a gas mixture of high purity hydrogen 99.99 wt % or more and high purity Ar 99.9 wt % or more, as atomizing gas, to the melting region through a gas nozzle at a flow rate ratio of "30 to 50":"70 to 50" under a high pressure or under a reduced pressure created by evacuation, thereby producing high purity metallic fine powder under an atomized reducing atmosphere.

DETAILED DESCRIPTION OF THE INVENTION

The ceramic super fine particles used in the present invention are finely dispersed to strengthen the mother phase of a matrix metal, enabling the solid lubricant particles or solid lubricant short size fibers to be positively held in the matrix. The solid lubricants can be thereby surely prevented from breaking away from the matrix during sliding operations and, as a result, superior sliding contact characteristics can be for a long term. The above effect cannot be achieved unless the ceramic particles dispersed for strengthening are finer than at least the solid lubricants.

More specifically, the satisfactory strengthening effect cannot be achieved unless the mean grain size of the ceramic particles is 200 nm or below. Smaller ceramic super fine particles are more preferable from the viewpoint of the strengthening effect, but requires a longer time for the mechanical alloying. For this reason, the preferable mean grain size of the ceramic particles is 1 to 100 nm. While the strengthening effect is obtained at the smaller content by finer dispersion, the content of the ceramic particles is preferably 0.01 to 1.0 wt %, more preferably 0.03 to 0.3 wt %.

The ceramic powder used in the present invention is one or two of an oxide, nitride, carbide and boride. Particularly preferable ceramic is one or more selected from $Al_2O_3$, $ZrO_2$, MgO, CrN, ZrN, $SiO_2$, $TiO_2$, AlN, $TiB_2$, $ZrB_2$, BN, $B_4C$, B-SiC, TiC, TiN and NbC which are less reactive with Al and Cu. The ceramic powder is preferably mechanically alloyed so as to have a grain size distribution ranging from 0.001 μm to 0.02 μm in the dispersion strengthened alloy. It is also preferable to use the ceramic powder of which mean grain size is not more than 0.1 μm before starting the mechanical alloying. This is because the ceramic particles are pulverized into finer particles in a ball mill, but a final grain size distribution depends on the size of starting particles. The necessity that the target grain size distribution be in the range of 0.001 μm to 0.02 μm is deduced from considerations that a lower limit in pulverization by the mechanical alloying is 0.001 μm order, and that effective resistivity against location is obtained at about 0.02 μm in maximum. In particular, the grain size distribution is preferably not more than 0.01 μm. Also, for the purposes of keeping the ceramic particles hard to react with Al or Cu matrix and maintaining high purity of Al or Cu matrix, it is preferable to use high purity ceramic which does not contain other metals. Taking into account the industrial productivity, the purity of the ceramic particles is preferably not less than 99.0%. Above all, AlN and h-BN are preferable because of being much less reactive with Al and Cu.

A base metal is preferably of Cu, Al, Fe, Ni, Co, Ti, etc. which are usually as structural materials. Such a base metal may be an alloy containing another element.

A description will now be given of copper as a base metal.

Copper and nitrogen are elements hard to react with each other. A direct coupling reaction between nitride ceramic and copper is also hard to occur. AlN and h-BN, particularly, for use in the nitride dispersion strengthening copper alloy of the present invention are poor in wetting property with other metals. Further, nitride and other metals are even less reactive with each other as the nitride has higher purity. It is therefore possible to prevent impurities from dispersing in copper matrix, i.e., prevent a lowering in purity of the copper matrix. Thus, using high purity AlN or BN 99.2 wt % or more as dispersion particles results in the improved strength of copper matrix at high temperature. The use of such dispersion particles also ensures stability of the particles and will not deteriorate excellent characteristics, i.e., high electric conductivity and high thermal conductivity, intrinsic to copper as matrix. High purity AlN or BN has high thermal conductivity and hence contributes to an improvement in thermal conductivity of the particle dispersed copper alloy member to a greater extent than using other ceramic particles which are not so thermal-conductive. The powder purity is preferably 99.2 wt % or more for each of AlN and h-BN. It is also desired that the AlN and BN powder having purity in the above range exhibit thermal conductivity not less than 150 W/m·K and 50 W/m·K, respectively.

A mechanism for increasing the strength of the particle dispersed copper alloy is attributable to the effect of dispersed particles to prevent dislocation movement that is responsible for plastic deformations of matrix (i.e., the kinetic dislocation pinning effect). The finer are dispersed particles and the shorter is the spacing between the dispersed particles, the greater will be the pinning effect. However, the reduced spacing between the dispersed particles resulted from the finer dispersed particles increases the location preventing ability so drastically that plastic deformations are hard to occur.

Therefore, the spacing between the dispersed particles requires adjustment, but that spacing is strongly dependent on the rate of the dispersed particles added and is also affected by the initial grain size, a degree of pulverization of particles by the ball mill, and aggregation of particles during the manufacturing.

In view of the above, the grain size of the dispersed particles is preferably 0.001 μm to 0.2 μm in order to provide satisfactory workability and toughness of the dispersion strengthened alloy. Where h-BN particles are added to improve the strength and wear resistance, the strength can be increased by super fine particles and the wear resistance can be improved by large particles having the grain size not less than 0.25 μm. Accordingly, a grain size distribution in entirety is 0.001 μm to 10 μm. In this case, the content of super fine particles is preferably not more than 1.0 wt % and the content of large particles is preferably 1 to 10 wt %.

According to the present invention, the mean grain size and the content of the ceramic super fine particles are not more than 200 nm and 1 wt %, respectively, and the ceramic particles are dispersed not less than 500 in number per section area of one square micrometer at 1 wt % substantially over the entirety region of the alloy, the number of the dispersed ceramic particles depending on the content. In particular, the number of the ceramic particles dispersed per section area of one square micrometer is preferably not less than 500, more preferably not less than 1000, at 0.001 wt %. While the mean spacing between the ceramic particles varies depending on the content, it is preferably set to any value on or below the straight line interconnecting a point E (0.01%; 100 nm) and a point F (1.0%; 10 nm), more preferably on or below the straight line interconnecting a point G (0.01%; 50 nm) and a point H (1.0%; 5 nm), when plotted in the logarithmic scale as mentioned before.

Thus, the present invention is to strengthen the mother phase of the matrix metal by dispersing ceramic super fine particles under specific conditions. As a result, the content of the ceramic super fine particles can be held at a trace amount and, therefore, thermal and electric characteristics of the matrix metal will not be significantly degraded by the strengthening.

Used as the solid lubricants are graphite powder, graphite whiskers, carbon fibers, BN powder, $W_2S$, $Mo_2S$ and so on. The grain size of the solid lubricants dispersed in a powdery state in the matrix metal is 0.25 to 10 μm. The whiskers or fibers are preferably 0.25 to 10 μm in diameter and not more than 500 μm, more preferably 100 μm, in length. The content of the solid lubricants is preferably 0.5 to 10 wt %, more preferably 1 to 5 wt %.

The mechanical alloying by using a high energy ball mill progresses such that particles of a matrix metal powder is plastically deformed and flattened with impact energy produced between balls moving in the mill or between the balls and the container wall, and ceramic particles and solid lubricants are embedded in each of the particles during the repeated processes of compressing pulverization and shearing attrition. Accordingly, while the melting process has difficulties in dispersing ceramic particles because of decomposition thereof, the present invention enables ceramic powder to be dispersed in and alloyed with the matrix metal on nano-meter order even at low temperatures nearly the room temperature by the above mechanical alloying process. In order to prevent impurities from entering and contaminating the metal matrix from the balls and the container as far as possible during the mechanical alloying, it is desired that any other metal than that as the base material is not used for the balls and the container. For this reason, the balls and the container are preferably made of a hard ceramics. In practice, preferably, the balls are made of $ZrO_2$ which has high toughness and high specific gravity, and the container is made of $ZrO_2$ likewise, or at least its inner wall is made of the same metal as the base material (copper to copper, for example) but having purity of 99.9 wt %. In the case of using Attoriter (a tradename of Attoriter Union Process Co.), a rotary shaft and an agitator located in the container are preferably coated with a liner made of comparable copper. Achieving satisfactory alloying requires not only high impact energy, but also an improvement of the alloying efficiency. To satisfy these requirements, it is preferable that the ratio of mixed powder weight to ball weight is 1/10 to 1/20 for Attoritor and 1/5 to 1/10 for a planetary type ball mill, and the rotational speed of the ball mill is 200 to 400 rpm. The mechanism of embedding (alloying) ceramic powder or solid lubricant particles in metallic powder, especially, such that the ceramic powder can be homogeneously dispersed in the super fine grain size preferably not more than 0.2 μm, is realized by increasing the grain size of alloy powder produced the mechanical alloying. This is achieved under the condition that the alloy powder contains the particles not less than 40 wt % of which grain size is not less than 60 μm.

It is believed that alloying of nitride particles occurs rapidly because of the use of soft copper powder, but at least 10 hours or more is required for more homogeneous and finer dispersion. Therefore, the alloying time is preferably relatively short, in particular 15 to 30 hours, for sliding contact materials added with h-BN in which a grain size distribution including large particles is required as mentioned before, and for sliding contact and electric contact materials made of a copper alloy containing graphite whiskers in which those whiskers are to be prevented from pulverizing into finer size. In other cases, the longer alloying time, i.e., 30 to 50 hours, is desired for still more homogeneous and finer dispersion. As a pretreatment before starting the alloying, the interior of the container is preferably baked at 100° to 200° C. for 30 to 60 minutes under $10^{-2}$ to $10^{-3}$ torr in order to prevent from mixing as far as possible. Particularly, where high purity copper powder is used, the container is preferably baked under a high vacuum of $10^{-4}$ to $10^{-5}$ torr. For the purpose of avoiding contamination by oxygen to the fullest possible, the atmosphere is preferably formed by high purity Ar gas 99.9 wt % or more under 1 atm. pressure or equivalent $N_2$ gas. Particularly, in the case of requiring more purification of powder produced by the mechanical alloying, the powder is preferably heat-treated in an atmosphere of hydrogen. More specifically, it is preferable that the heat treatment is made at the purifying temperature of 700° to 900° C. in a stream of high purity hydrogen gas 99.99 wt % or more purified by using Pd.

The dispersion alloyed powder is sintered by the thermal extrusion, HIP (Hot Isostatic Pressing) or hot pressing process after filling the alloyed powder in a container made of the same metal as the base metal. Taking into account diffusing fusion and densification of the alloyed powder, the sintering is preferably carried out in the range of 600° to 800° C. for Cu or Cu alloys of the base material, 500° to 650° C. for Al or Al alloys of the base material, and 1000° to 1150° C. for Fe or Fe alloys of the base material. As a pretreatment before starting the sintering, the container evacuating process is performed similarly to the above for removing adsorbed moisture, oxygen and other impurities out of the container sequentially so that gas impurities such as oxygen will not cause contamination during the sintering at high temperatures as far as possible. In this case, however, the evacuation process is preferably carried out stepwise under a vacuum of $10^{-4}$ to $10^{-5}$ torr at 100° C. for 10 to 30 minutes, at 200° C. for 10 to 30 minutes, and at 400° C. for 30 minutes.

In the nitride dispersed copper alloy, addition of graphite whiskers is preferable in, first, applying high lubricating property and heat resistance to the nitride dispersed copper alloy, thereby providing suitable sliding contact materials, and secondly applying superior low contact resistance and depositing resistance, thereby providing suitable electric contact materials for circuit breakers, switches and so on. If the rate of graphite whiskers added is not more than 1 vol %, the above characteristics cannot be fully developed. But if it is not less than 10 vol %, the graphite content is too large, resulting in that electric contact materials, for example, exhibit an inferior arc discharge durability and toughness is generally lowered. Accordingly, the preferable range of the graphite content is 1 to 10%. It is desired that graphite whiskers used are highly thermal-conductive and in the form of fibers having a smaller diameter. In other words, graphite whiskers being properly finely and homogeneously dispersed and oriented at random by the mechanical alloying makes it possible to efficiently improve thermal conductivity of the mechanically alloyed copper alloy, wear resistance of the alloy surface, and further an arc discharge durability for higher erosion resistance. For that reason, higher thermal conductivity of the graphite whiskers is more preferable. Taking into account the industrial productivity, the graphite whiskers preferably have thermal conductivity not less than 1000 W/m·K, a diameter of 0.3 to 2 μm, and a length of about 100 μm maximally.

In consideration of the target strength of reference and application products from existing examples of $Y_2O_3$ dispersion strengthening Fe and Ni base alloys, the rate of AlN or h-BN separated added for dispersion and the rate of AlN and h-BN both added together is preferably 0.05 to 0.2 wt % for metallic superconducting stabilizers which do not necessarily require high strength at the room temperature, 0.2 to 1.0 wt % heat sink materials for the first wall diverter of a fusion reactor, lead frames for semiconductors and integrated circuits, spot welding electrodes, and sliding contact and electric contact materials made of a copper alloy containing graphite whiskers, which require the high strength, particularly, at high temperatures, and 1.0 to 10% for those sliding contact materials in which h-BN is added as a lubricant to improve lubricating property.

In plastic deformations of a particle dispersion strengthening copper alloy, deformation resistance has a negative temperature dependency. This is because fine dispersed particles in nano-meter order to several tens nano-meter serve as thermal activation barriers against dislocation. Even for metallic superconducting stabilizers in which the content of dispersed particles is relatively low, sufficient strength can be obtained since they are used at a very low temperature about 4.2K. The reason why the upper limit of the grain size distribution of copper powder for constituting a copper matrix is set to 200 μm is as follows. If the grain size is too small, the surface area of copper matrix to be covered would be so increased as to cause a fear that the amount of surface oxidation occurred during the manufacturing, i.e., oxygen in copper matrix, may increase excessively. Conversely, if the grain size is not less than 200 μm, it would be difficult to homogeneously disperse the copper powder during the mechanical alloying. While the copper powder is desired to be as pure as possible for the metallic superconducting stabilizers and heat sink materials of the first wall diverter of a fusion reactor both of which require ultimate electric conductivity and thermal conductivity, the purity 99.9% or more is preferable, taking into account the industrial productivity and cost. For other above-mentioned application products except the metallic superconducting stabilizers and heat sink materials of the first wall diverter of a fusion reactor, the purity of the copper powder is 99.0 to 99.9 wt % in the range of usual pure copper. Using copper added with trace amounts of Al and Mg is intended to not only fix oxygen, unavoidably mixed during mechanical alloying, in the form of $Al_2O_3$ and MgO through reactions with the added elements, but also enhance the strength by causing these oxides to serve as barriers against dislocation. In spite of taking care to prevent oxygen from mixing during the pretreatment oxidation of the copper surface and the mechanical alloying, a component analysis result showed the presence of oxygen ranging from 0.06 to 0.09 wt %, as seen from the following description of embodiments. To fix oxygen of at least 0.06 wt %, Al and Mg are required to be added 0.13 wt % and 0.06 wt %, respectively. Therefore, Al and Mg are preferably added not more than 0.13 wt % and 0.06 wt %, respectively, so that surplus Al and Mg will not brought into a solid-solution state. The residual oxygen can be removed by heat-treating the alloyed powder in a hydrogen atmosphere.

EXAMPLE 1

Figure 1:
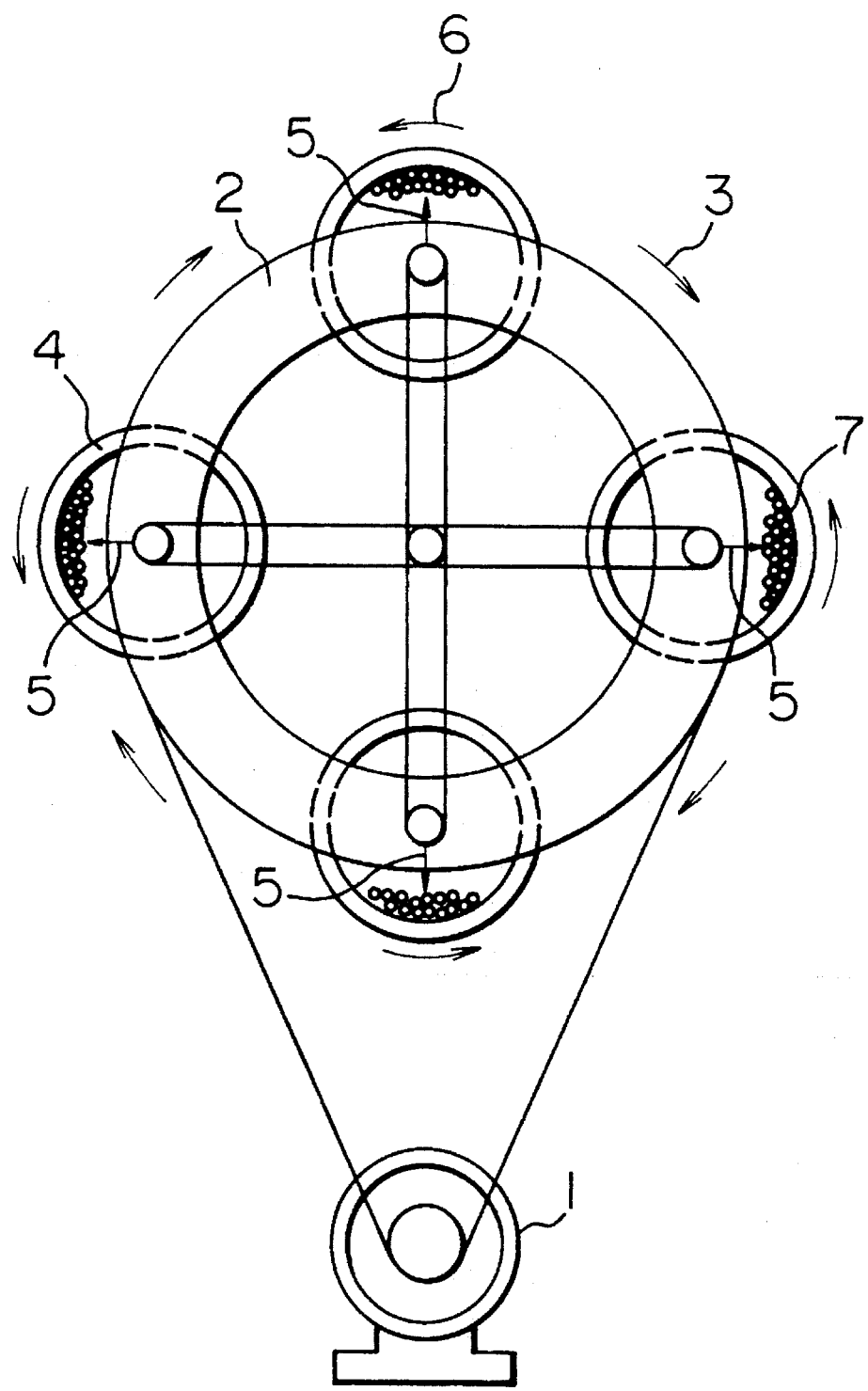
FIG. 1 is a schematic view of a mechanically alloying apparatus.

An embodiment of a method for manufacturing particle dispersion strengthened alloy powder in which nitride, oxide or carbide particles and solid lubricants are dispersed, according to the present invention, will be described with reference to FIG. 1. FIG. 1 is a schematic view of a mechanical alloying apparatus, showing a planetary type ball mill. Rotations are transmitted from an external driving system 1 to a stand frame 2 for revolving it. Simultaneously, centrifugal forces indicated by arrows 5 are produced in four attrition containers 4 disposed crosswise on the stand frame 2. The revolving stand frame 2 and the attrition containers 4 rotating their own axes repeat opposite rotational movements to generate strong centrifugal accelerations so that powder and balls 7 in the attrition containers 4 collide with each other at high energy.

Figure 2:
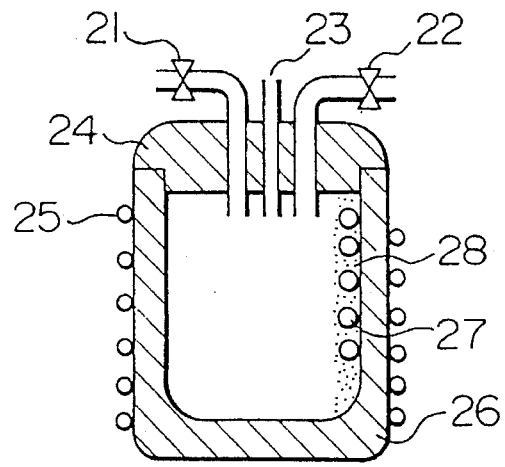
FIG. 2 is a schematic view of a mechanically alloying apparatus.

The attrition containers 4 each comprise, as shown in FIG. 2, cap 24 made of a copper- or $ZrO_2$ provided with a vacuum-leak valve 21, an Ar or nitrogen gas inlet valve 22 and a thermocouple inlet tube 23 for measuring the temperature, container 26 made of a copper-, $Al_2O_3$- or $ZrO_2$ having a volume of 500 cc and provided with a tape-type heater 25 wound around the container, balls 27 made of $ZrO_2$ being 10 mm in diameter, and mixed powder 28, both the balls 27 and the mixed powder 28 being put in the container 26. The balls 27 rotate along an inner wall of the container 26 while colliding with one another and the inner wall of the container 26. Used as the cap 24 and the container 26 were ones manufactured by way of trial using oxygen-free copper (OFC) with purity of 99.99 wt %, or commercially available ones made of $Al_2O_3$ or $ZrO_2$, and then subjected to the mechanical alloying. In the case of using the container made of OFC, since the strength of OFC is low, the container was manufactured by cold working and filled with only a nitride, oxide or carbide before actually starting the mechanical alloying so that an inner wall of the container was strengthened by dispersion of the nitride, oxide or carbide.

The purity and the mean grain size of each of starting powders used in this embodiment was shown in Table 1 below.

Figure 3:
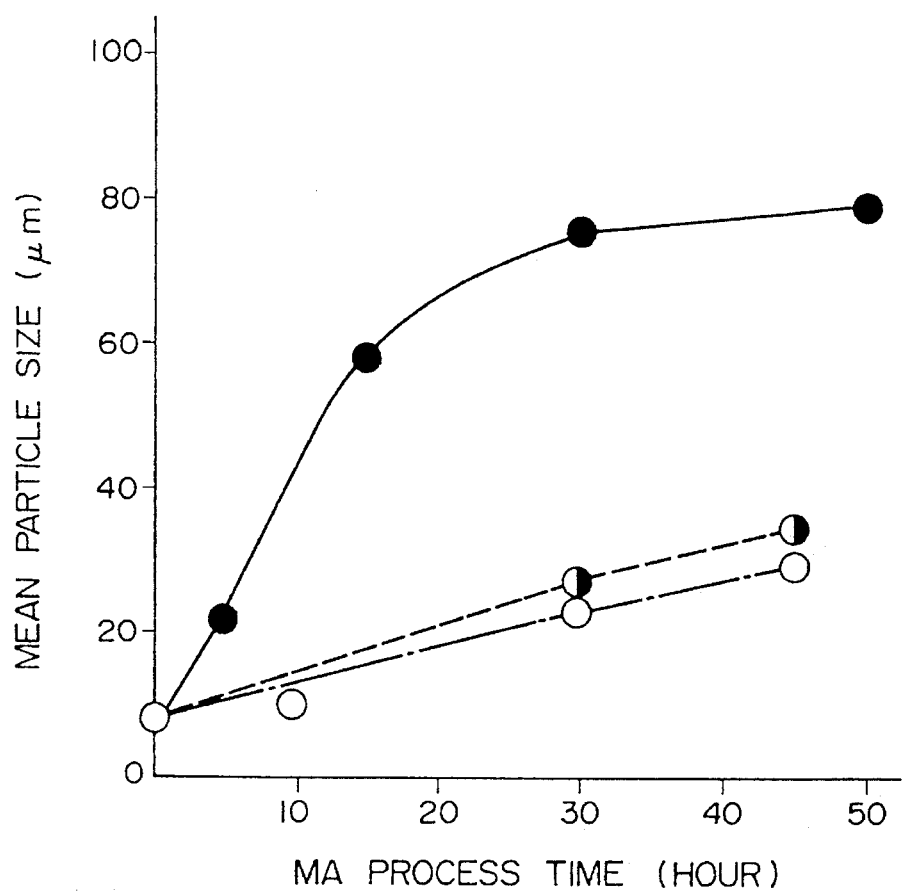
FIG. 3 is a graph showing the relationship between an MA process time and the mean grain size of particles.

FIG. 3 is a graph showing the relationship a mechanical alloying (MA) process time and the mean grain size of powder particles produced by using No. 1 alloy powder. As seen from the graph of FIG. 3, it was confirmed that the mean grain size of the alloy powder increased with the elapse of the MA process time, and this increase in the grain size promoted a size reduction and dispersion of the ceramic and solid lubricant particles. It is also seen that the ball pressing force is proportional to the rotational speed, and that the alloying does not so progress at 150 rpm or below even for a long period of time, but progresses remarkably at 200 rpm or more.

Figure 4A:
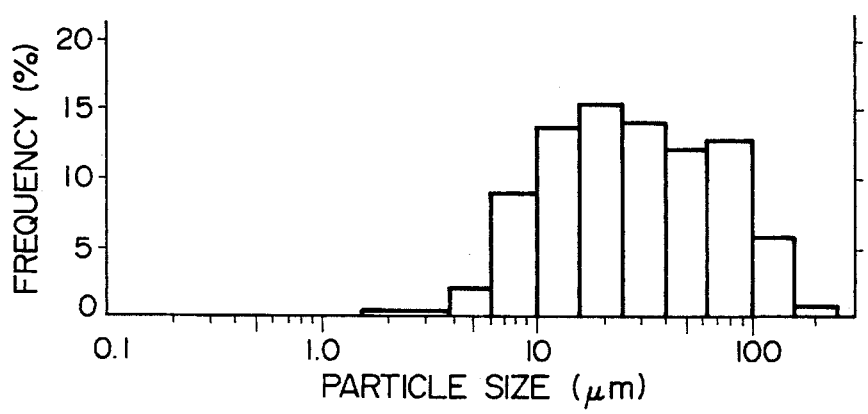
FIG. 4a–4c are bar graphs showing the relationship between the grain size and a particle abundance rate.
Figure 4B:
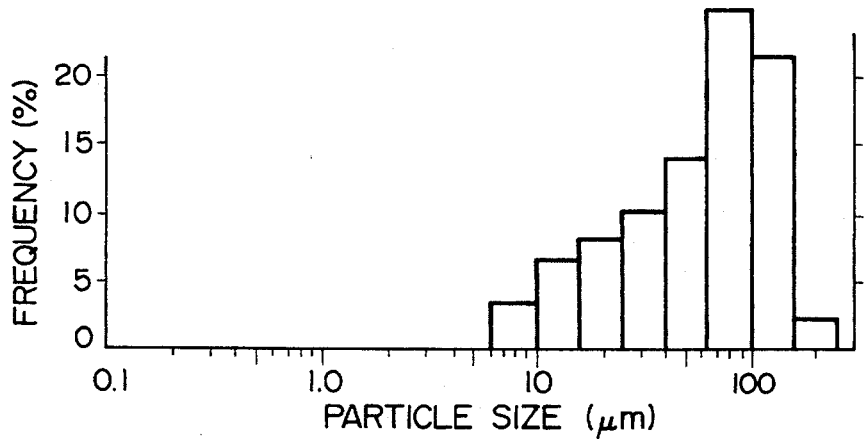
Figure 4C:
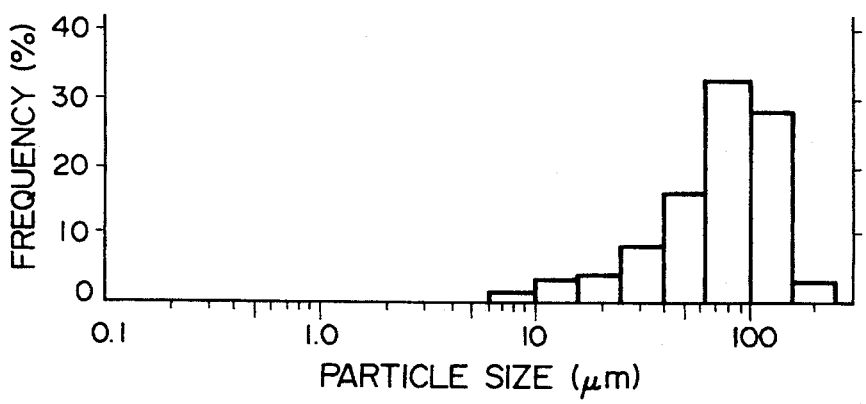

FIGS. 4a–4c are bar graphs showing a grain size distribution of the produced alloy powder. The alphabet letters a, b and c in FIG. 3 correspond to FIGS. 4a–4c, respectively.

As seen from FIG. 4a, alloying of the powder a does not yet so progress and the alloying rate of those particles having the grain size not less than 60 μm is only about 15%. However, the above alloying rate increases to 40% or more at the powder b (FIG. 4B) and to 60% or more at the powder c (FIG. 4C). From the standpoint of the alloying, in particular, the alloying rate of those particles having the grain size not less than 60 μm is preferably not less than 40% as resulted at the powder b, more preferably not less than 60% as resulted at the powder c.

Referring to Table 1, each mixed powder 1500 g of Cu, Al or Fe powder, one of $Al_2O_3$, $ZrO_2$, MgO, $SiO_2$, $TiO_2$, AlN, BN, $B_4C$, β-SiC, TiC, and NbC powders, and graphite whiskers was filled in the four containers along with 200 balls in a glove box under a high purity Ar atmosphere. The balls and the interior of the ball mill container were fully cleaned by pre-operation of the ball mill using alcohol and acetone. The mechanical alloying process was started by replacing air in the container with high purity Ar gas 99.99 wt % under 1 atm. pressure and sealing up the container at the time a degree of vacuum reaches $10^{-2}$ to $10^{-3}$ torr by evacuation and subsequent heating at about 120° C. The rotational speed was 300 rpm and the process time was 30 hours. After the mechanical alloying, the alloyed powder was put into a preserving container and sealed up under a vacuum inside the aforesaid glove box. It was found

TABLE 1

| Powder Used | Purity (wt %) | Mean Grain Size (μm) |
| --- | --- | --- |
| Cu | 99.99 | 8 |
| Al | 99.99 | 120 |
| Fe | 99.99 | 30 |
| $Al_2O_3$ | 99.999 | 0.05 |
| ZrN | 99.9 | 0.1 |
| $ZrO2$ | 99.9 | 0.1 |
| MgO | 99.99 | 0.06 |
| $SiO2$ | 99.99 | 0.1 |
| TiN | 99.9 | 0.1 |
| $TiO2$ | 99.9 | 0.07 |
| AlN | 99.9 | 0.05 |
| BN | 99.4 | 0.07 |
| $B_4C$ | 99.0 | 0.1 |
| CrN | 99.5 | 0.1 |
| β-SiC | 99.5 | 0.08 |
| TiC | 99.5 | 0.05 |
| NbC | 99.0 | 0.06 |
| graphite whiskers | — | dia. 0.5 μm length 10 μm | that the alloyed powder was pulverized while deforming into the flattened form and ceramic particles were embedded in Cu, Al or Fe powder particles, possibly as a result of deformations and forging repeated many times. Also, using 250 mesh of high purity Al powder each particle of which has alumina film thereon, similar mixed powder was mechanically alloyed by the ball mill in a like manner to above. By so mechanical alloying the mixed powder, copper oxide, alumina or ferrous oxide on the powder surface was very finely alloyed into the metallic powder and homogeneously dispersed.

Described below is a sintering process for solidifying the dispersion strengthening alloy powder thus produced. After filling the alloy powder in a container made of Cu, Al or Fe with high purity of 99.99 wt % and having a vacuum-leak pipe inside a glove box, the interior of the container was evacuated stepwise under a vacuum of $10^{-2}$ to $10^{-3}$ torr at 100° C. for 20 minutes, at 200° C. for 20 minutes, and at 400° C. for 30 minutes. After completion of the evacuation, the pipe was pressed at two locations and the pressed pipe ends were tightly closed by TIG (tungsten inert gas) welding. The sintering was carried out by using an HIP (hot isostatic pressing) apparatus for 1 hour at 900° C. for the Cu system powders, 60° C. for Al system powders, and 1050° C. for Fe system powders. Thereafter, hot pressing was carried out at 850° C., 550° C. and 1050° C. for Cu, Al and Fe system powders, respectively. An electric resistance sample and a tensile strength test sample were prepared from each final alloy, followed by annealing under vacuum of 2 to $4 \times 10^{-8}$ torr for 1 hour at 900° C., 600° C. and 1200° C. for Cu, Al and Fe system powders, respectively. A resistance value as electric characteristics, thermal conductivity, and the yield strength at the room temperature were measured. The composition and measured results of each of the dispersion strengthened alloys are shown in Table 2. It was confirmed that the alloys of the present invention had the high strength, large thermal conductivity, and low electric resistance values.

the spacing value may be more or less deviated from the measured values. In other words, the ceramic particles are preferably dispersed so that the mean spacing falls within the rectangular region defined by straight lines interconnecting a point A (0.01%; 20 nm), a point B (0.01%; 500 nm), a point C (1.0%; 50 nm) and a point D (1.0%; 2 nm) as shown, more preferably on or below the straight line interconnecting a point E (0.01%; 100 nm) and a point F (1.0%; 10 nm), most preferably on or below the straight line interconnecting a point G (0.01%; 50 nm) and a point H (1.0%; 5 nm). The smaller mean spacing of the ceramic particles dispersed, the higher is the strength. But setting the mean spacing to a value on or above the straight line interconnecting the points A and D, satisfactory electric characteristics, strength, elongation, etc. can be obtained.

Figure 6:
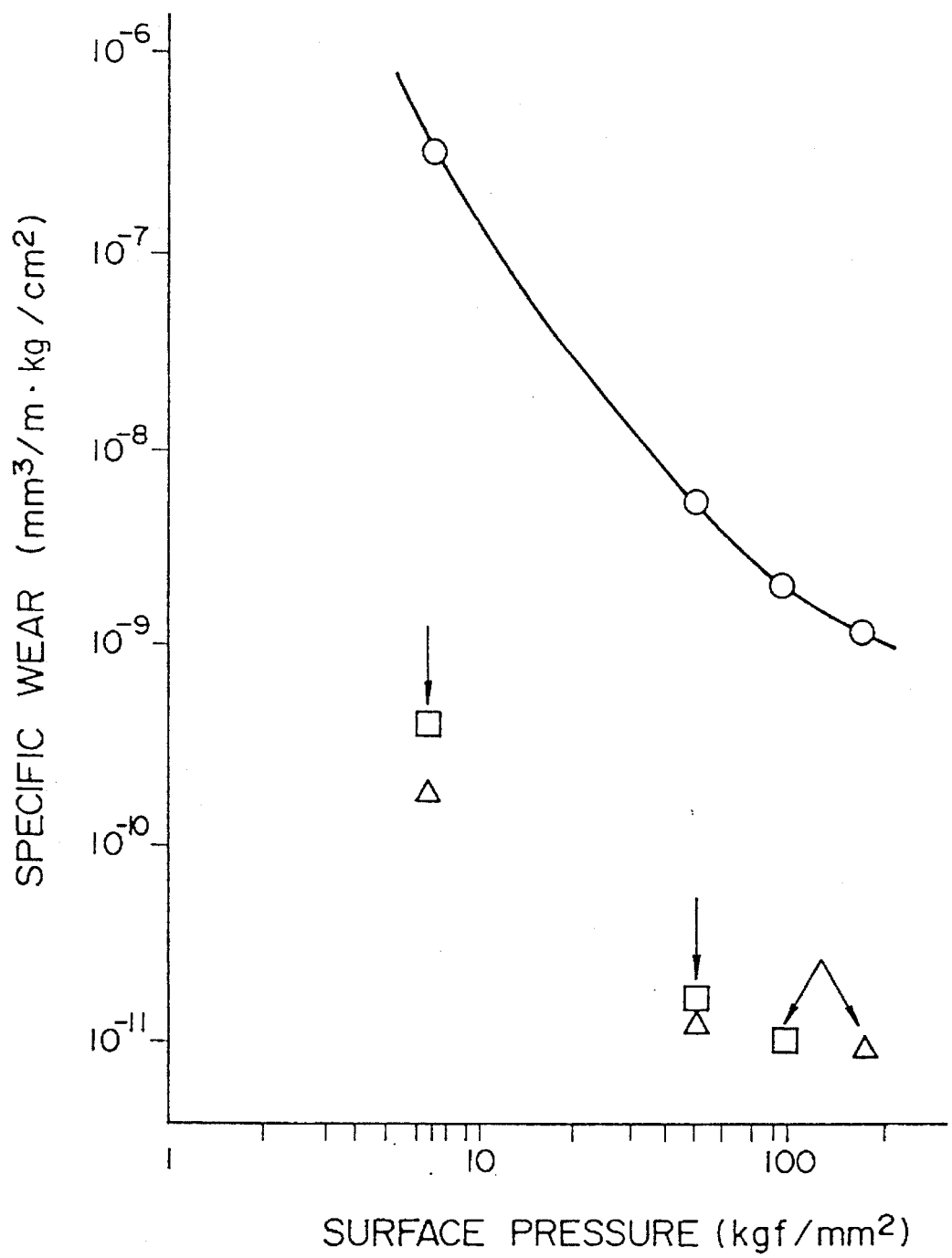
FIG. 6 is a graph showing the relationship between a surface pressure and a specific wear.

FIG. 6 shows results of wearing tests made on the Cu system materials as compared with a molten and cast alloy

TABLE 2

| No. | Composition (vol %) ( ) Indicates Weight Ratio to Cu, Al, Fe | Mixing Ratio of Ingredients (wt %) | Yield Strength (MPa) | Thermal Conductivity (W/m · k) | Specific Resistance ($\Omega\mu$ · cm) |
|---|---|---|---|---|---|
| 1 | 95 (Cu-0.10BN)-5(graphite whisker) | Cu 98.70, BN 0.098, graphite 1.20 | 430 | 374 | 23.7 |
| 2 | 90 (Cu-0.10BN)-10(graphite whisker) | Cu 97.27, BN 0.102, graphite 2.63 | 471 | 338 | 28.0 |
| 3 | 95 (Cu-0.10AlN)-5(graphite whisker) | Cu 98.70, AlN 0.098, graphite 1.20 | 416 | 390 | 32.1 |
| 4 | 90 (Cu-0.10AlN)-10(graphite whisker) | Cu 97.27, AlN 0.102, graphite 2.63 | 474 | 382 | 37.5 |
| 5 | 95 (Al-0.10BN)-5(graphite whisker) | Al 98.70, BN 0.098, graphite 1.20 | 396 | 219 | 14.7 |
| 6 | 90 (Al-0.10BN)-10(graphite whisker) | Al 97.27, BN 0.102, graphite 2.63 | 445 | 204 | 28.9 |
| 7 | 95 (Al-0.10TiN)-5(graphite whisker) | Al 98.70, TiN 0.098, graphite 1.20 | 401 | 195 | 14.8 |
| 8 | 90 (Al-0.10TiN)-10(graphite whisker) | Al 97.27, TiN 0.102, graphite 2.63 | 454 | 186 | 27.3 |
| 9 | 95 (Fe-0.10BN)-5(graphite whisker) | Fe 98.70, BN 0.098, graphite 1.20 | 413 | 47 | 21.7 |
| 10 | 90 (Fe-0.10BN)-10(graphite whisker) | FE 97.27, BN 0.102, graphite 2.63 | 476 | 50 | 35.8 |

Figure 5:
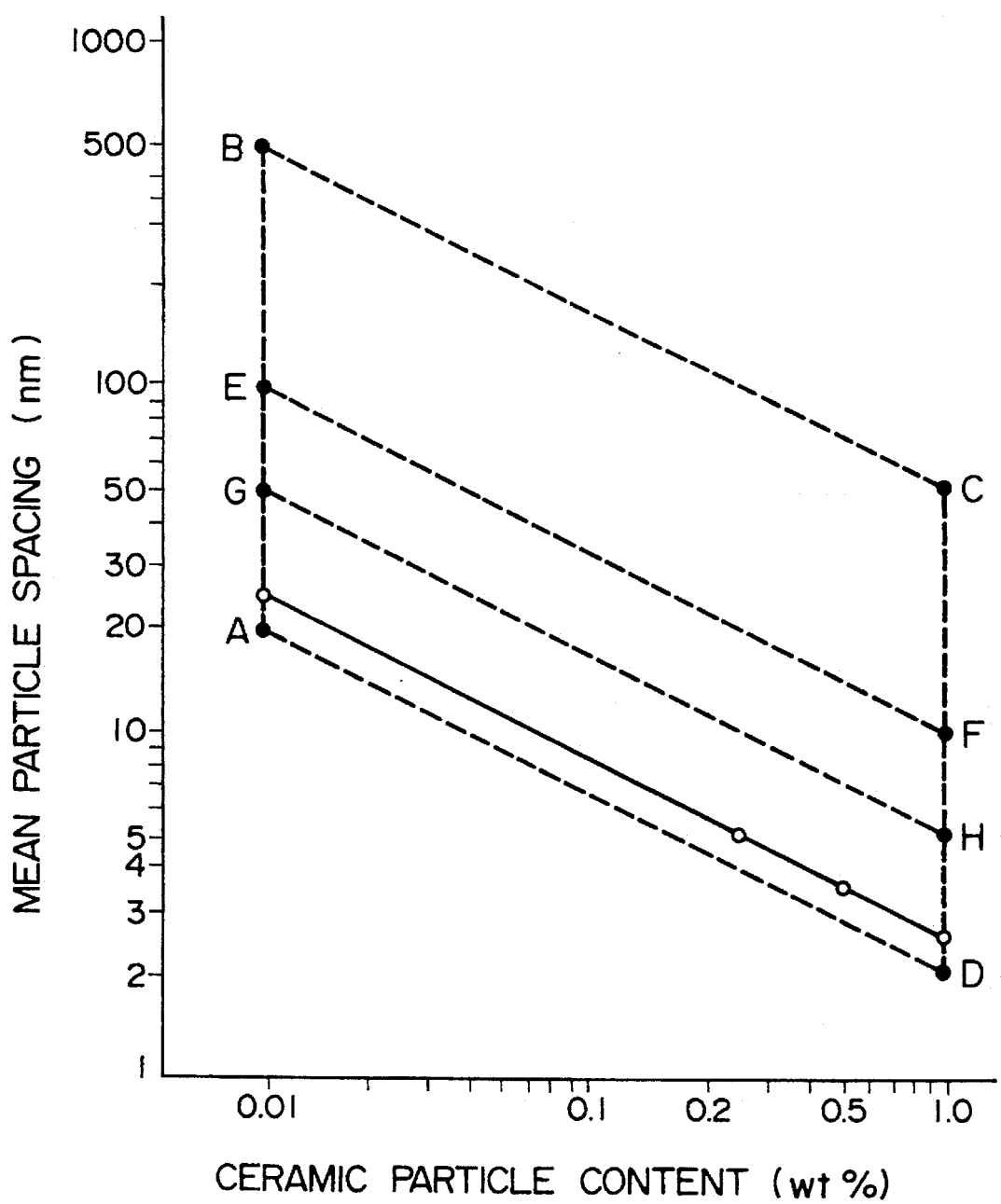
FIG. 5 is a graph showing the relationship between the content of ceramic particles and the mean particle spacing.

FIG. 5 is a graph showing, in a logarithmic scale, the relationship between the mean spacing and the content of dispersed ceramic particles. In this embodiment, the diameter of the ceramic particles dispersed in the pure metal was not more than 0.02 μm and most of the particles, i.e., about 95% or more in number, was 0.002 to 0.008 μm (mean value: 0.005 μm). Considering that fine and homogeneous dispersion of ceramic super fine particles in metal crystal grains provides the strengthening, elongation and superior electric characteristics, the mean spacing between the dispersed particles was measured as in index of dispersion in this embodiment. The data shown in FIG. 5 at the contents of 0.01%, 0.25%, 0.5% and 1.0% are values resulted for the Al system members containing 5 vol % graphite whiskers. As will be seen, as the ceramic content increases, the mean spacing is reduced and Al is strengthened correspondingly. In this embodiment, the mean spacing between the ceramic super fine particles was about 2.5 nm at the content of 1.0 wt %, about 3.5 nm at 0.5 wt %, about 5 nm at 0.25 wt %, and about 25 nm at 0.01 wt %. It was also found that the number of the ceramic particles dispersed per section area of one square micrometer at the content of 0.01 wt % was about 1500, and the number at 0.1% and 1.0% increased substantially proportional to the contents. The ceramic particles were dispersed with the mean spacing as mentioned above, material. The mating material was graphite. Sliding contact tests of No. 1 alloy sample resulted in that the specific wear was $4 \times 10^{-10}$ (mm³/m·kg/cm²) in the so-called dry test (surface pressure; 7 kgf/mm²) using no lubricant, $1.5 \times 10^{-11}$ (mm³/m·kg/cm²) in the test (surface pressure; 50 kgf/mm²) using water as an lubricant, and $1 \times 10^{-11}$ (mm³/m·kg/cm²) in the test (surface pressure; 100 kgf/mm²) using turbine oil as a lubricant.

For No. 2 alloy sample, the specific wear was $2 \times 10^{-10}$ (mm³/m·kg/cm²) in the dry test using no lubricants, $1.2 \times 10^{-11}$ (mm³/m·kg/cm²) in the test using water as an lubricants, and $1 \times 10^{-11}$ (mm³/m·kg/cm²) in the test using turbine oil as a lubricant.

A curve in FIG. 6 represents data of the comparative alloy, i.e., a typical wear-resistant copper alloy of Cu—9Al—0.8—Ti—10 graphite, manufactured by the fusion alloying process of melting and casting.

EXAMPLE 2

Figure 7:
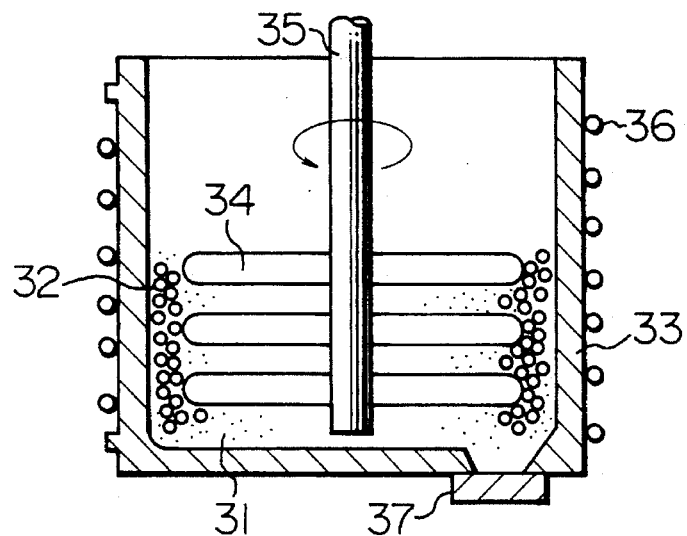
FIG. 7 is a schematic view of the mechanically alloying apparatus.

FIG. 7 is a sectional view showing another embodiment of the mechanical alloying apparatus. The apparatus of this embodiment is generally called Attoritor (a trade name). The mechanical alloying is carried out as follows. Raw material powder 31 and balls 32 as an alloying medium are both put in a mechanical alloying container 33 and are agitated by an agitator 35 having arms 34. By carrying out the above process, particle dispersion strengthening powder was manufactured by mechanical alloying.

Additionally, the apparatus of this embodiment is provided with an external heater 36 for adjusting the alloying temperature inside the container 33. The alloyed powder produced after the alloying process was recovered through a recovering hole 37 provided at the container bottom.

EXAMPLE 3

Figure 8A:
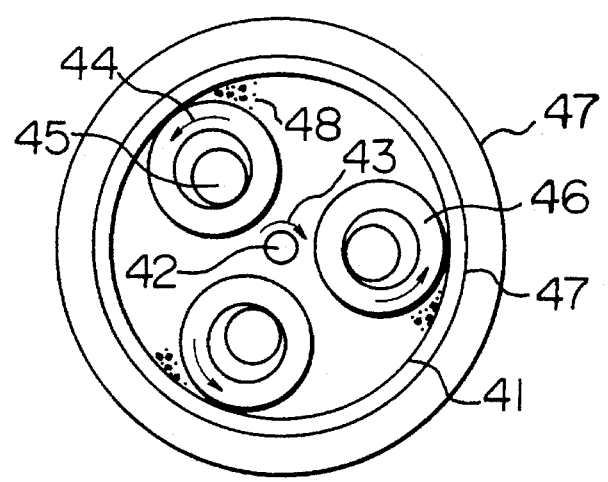
FIG. 8a is a horizontal cross-sectional view of the mechanical alloying apparatus.
Figure 8B:
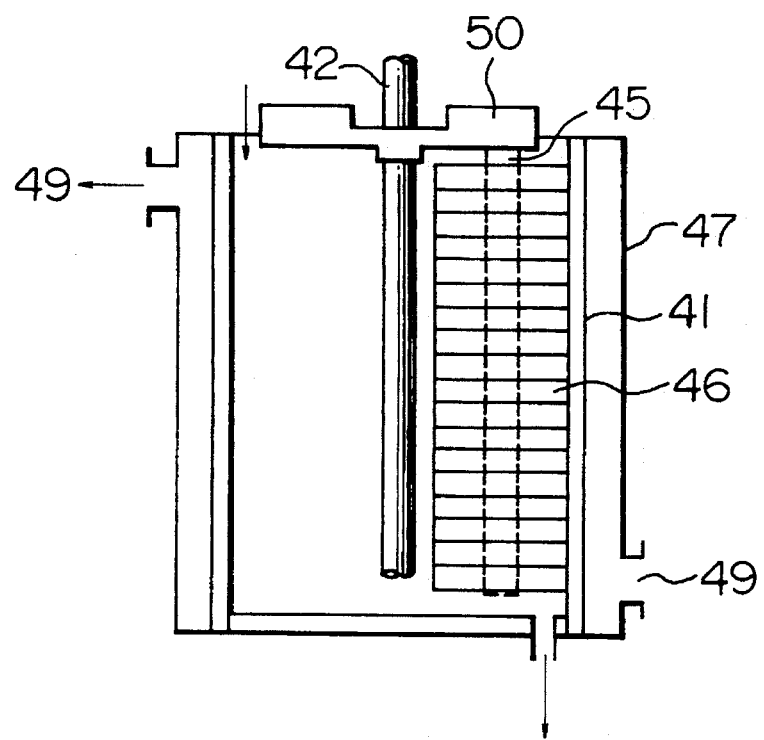
FIG. 8b is a vertical cross-sectional view of the mechanical alloying apparatus.

FIGS. 8a and 8b are a horizontal and a vertical sectional views, respectively, showing still another embodiment of the mechanically alloying apparatus. The apparatus of FIGS. 8a and 8b comprises a stationary container 41, a main shaft 42 rotating about its axis within the container 41, and several sub shafts 45 revolving, as indicated by arrows 44, in conjunction with rotation, indicated by arrow 43, of the main shaft 42. The subshafts 45 supported by terminal beard 50 are each provided with a number of ring-shaped grinding media 46. A gap of several millimeters is left between an outer periphery of the sub shaft 45 and an inner periphery of the ring-shaped grinding medium 46 so that each ring can move freely. The ring serving as the grinding medium revolves inside the grinding container while being pressed against an inner wall of the container by a centrifugal force.

Particles 48 to be processed are sandwiched between the revolving grinding media 46 and the wall surface, and are subjected to attrition due to the combination of centrifugal forces produced on the rings and rotation of the rings themselves, whereby the mechanical alloying is developed. The grinding container has a jacket 47 through which cooling water 49 is passed to suppress a temperature rise of the particles under process.

It is desired that materials of the inner wall of the grinding container and the rings as the grinding media are the same; hence the materials must be selected depending on the raw material powder. Ceramic materials such as $Al_2O_3$, and $ZrO_2$ are preferable for the copper and aluminum alloys, while stainless steels (JIS SUS) steel materials are preferable for ferrous alloys.

EXAMPLE 4

Figure 9:
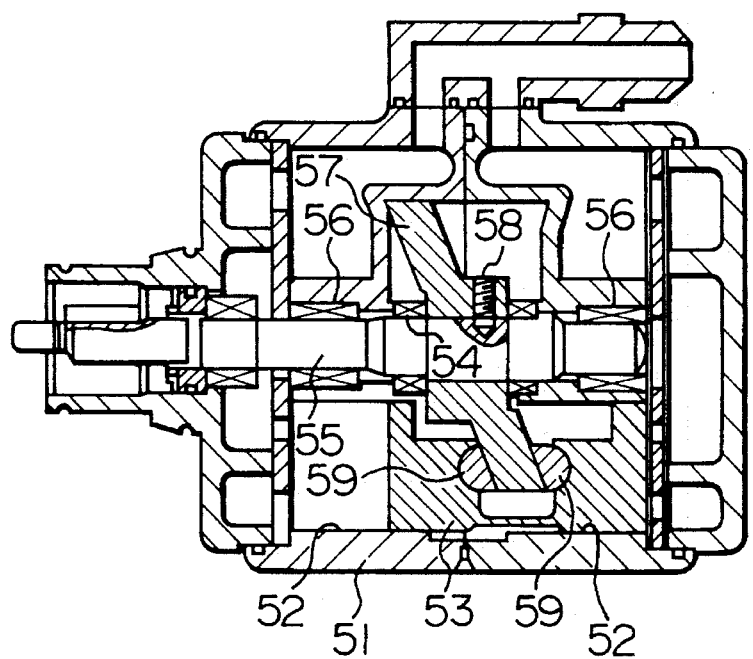
FIG. 9 is a sectional view of a swash-plate type compressor.

FIG. 9 is a sectional view of a swash-plate type compressor for car air conditioners using the No. 4 alloy of Example 1 as the Cu base alloy according to the present invention. In the compressor of this embodiment, a shaft 55 is rotated by operation of a solenoid clutch, whereupon a swash-plate 57 attached to the shaft 55 is rotated together with the shaft 55 to effect a swing motion. This swing motion causes a piston 53 to move reciprocally. The piston 53 is provided with a sliding member 59 held in sliding contact with the swash-plate 57. The sliding member 59 is formed of the Cu base alloy according to the present invention mentioned above. This compressor was assembled in a car air conditioner for an endurance test.

Test conditions were as follows; rotational speed: 5500 rpm, delivery gas pressure: 30 kgf/cm$^2$, inlet side gas pressure: 2 kgf/cm$^2$, test time: 500 hours, lubricant: polyalkylene glycol, and coolant: R134a. For comparison, a similar endurance test was also made on a compressor comprising a cylinder made of a B390 alloy and a piston made of "PTFE+30 vol % carbon fibers+2 vol % $CaF_2$".

The volumetric efficiency and total adiabatic efficiency were measured at 1 hour and 500 hours after starting the test. The volumetric efficiency is represented by a ratio of the theoretical volume of a cylinder bore and the delivery rate, and is reduced if a gap occurs between the cylinder bore and the piston ring. The total adiabatic efficiency represents a contribution rate of compressors to cooling energy as a result of converting rotational energy into thermal energy, and is also reduced if a gap occurs between the cylinder bore and the piston ring. Accordingly, the volumetric efficiency and total adiabatic efficiency can be considered as indices for evaluating durability of compressors. Thus, the smaller a reduction in the efficiency, the more are compressors endurable. The compressor using the Cu base alloy of the present invention had the volumetric efficiency of 60% and the total adiabatic efficiency of 57% even after 500 hours. The resulting small reduction in the efficiency means superior durability of the compressor.

On the other hand, the comparative compressor had the volumetric efficiency of 52% and the total adiabatic efficiency of 49% after 500 hours.

Additionally, the swash-plate 57 and the piston 53 may be formed of the Al system alloy according to the present invention.

EXAMPLE 5

Figure 10:
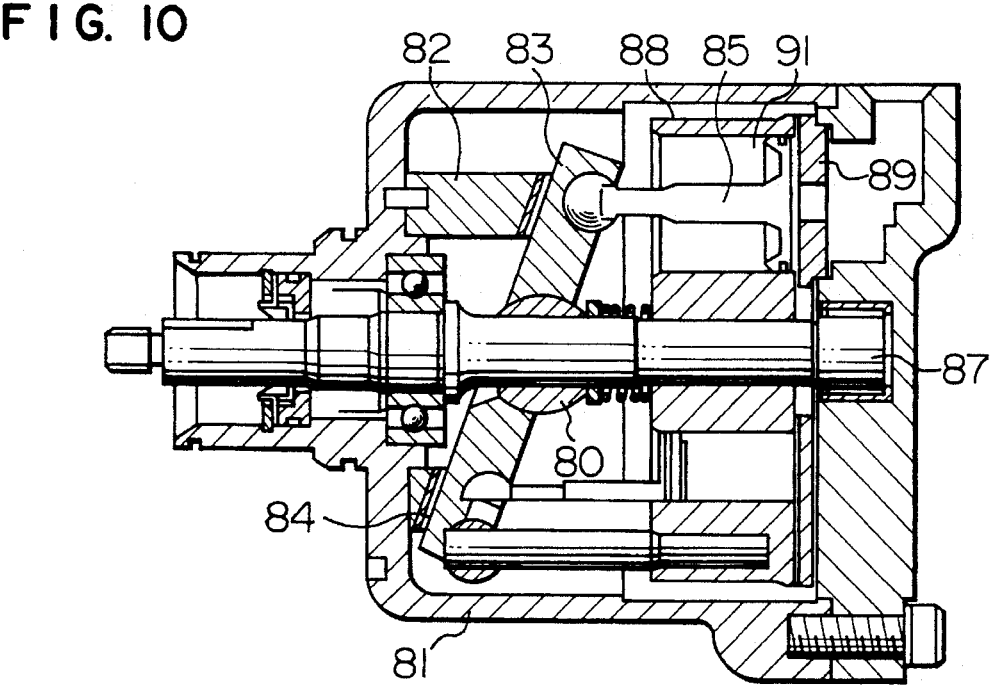
FIG. 10 is a sectional view of a compressor.

FIG. 10 shows a sectional view of primary parts of one embodiment in which a sliding contact member formed of the Al system alloy according to the present invention is employed in a compressor. Referring to FIG. 10, a spacer 82 is disposed in a cup-shaped shell or casing 81, and a surface of the spacer 82 held in sliding contact with a wobble plate 83 is covered by a steel sheet (shoe disk) 84 having a surface layer formed of synthetic resin as a main ingredient. The wobble plate 83 is formed of the Al system alloy listed in Example 1 as No. 6 alloy. A spherical portion 86 of a piston 85 is pivotably held by the wobble plate 83, and the wobble plate 83 is rotatably supported by a center ball 80 fitted over a rotary shaft 87. Further, a cylinder block 88 having a plurality of through holes 91 around the axis is fixed to the rotary shaft 87, and the piston 85 is fitted in each of the through holes 91 in the cylinder block 88. The cylinder block 88 can be formed of the Al system alloy as with the rotary plate 83. A cylinder head 89 having a delivery hole to delivery compressed air therethrough is disposed to close one ends of the through holes 91 in the cylinder block 88.

Described below is the operation of the compressor. When the rotary shaft 87 is rotated by an internal combustion engine, for example, the wobble plate 83 and the cylinder block 88 are rotated together, whereupon the pistons 85 move reciprocally in the cylinder through holes 31 for sucking and compressing air. At this time, a pair of the steel sheet 84 covering the spacer 82 and the wobble plate 83 and another pair of the cylinder block 88 and the cylinder head 89 respectively slide with each other in synch with the rotation of the rotary shaft 87. Since these sliding motions are effected at a high speed while being additionally subjected to a pressure produced upon compressing air, the compressor operates under a high-speed, high-load sliding condition. Such a high-speed, high-load sliding condition makes it difficult to sufficiently supply a lubricant and hence may leads to boundary lubrication or no-lubrication. Therefore, the sliding contact surfaces are preferably formed of self-lubricating materials. In this embodiment of the present invention, since the material contains lubricant particles fixed therein, there is no fear of seizure even if the sliding contact surfaces are brought into a state of boundary lubrication or no-lubrication.

The compressor of this embodiment was assembled in a car air conditioner for an endurance test. Test conditions were as follows; rotational speed: 5500 rpm, delivery gas pressure: 29 kgf/cm$^2$, inlet side gas pressure: 2 kgf/cm$^2$, test time: 200 hours, lubricant: polyalkylene glycol, and coolant: R134a. For comparison, a compressor having a cylinder block and a wobble plate each formed with a usual anode oxidation layer was also subjected to an endurance test under the same conditions.

EXAMPLE 6

Figure 11:
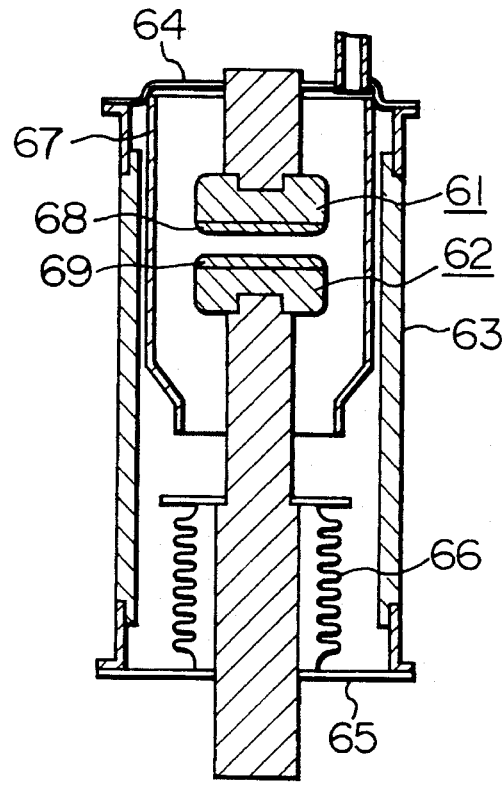
FIG. 11 is a sectional view of a vacuum circuit breaker.

FIG. 11 shows the structure of a vacuum valve using the No. 2 Cu system alloy listed in Example 1 as electrode material, the vacuum valve being subjected to a circuit breaking (or closing) characteristic test. The vacuum valve has a container composed of a cylindrical ceramic insulating case 63 and stainless terminal boards 64 and 65, the interior space of the container being kept at a high vacuum on the order of $10^{-6}$ to $10^{-8}$ torr. Within the container are disposed a pair of electrodes formed of the electrode material according to the present invention, i.e., a fixed electrode 68 fixed on a pedestal 61 and a movable electrode 69 fixed on another pedestal 62 arranged movably through a bellows 66. These electrodes are each comprised of an electrode portion and a support member for the electrode portion. A cylindrical shield 67 is disposed so that when the electrode structural member is evaporated and scattered upon breaking arcs, the shield 67 prevents the scattered material from depositing onto an inner wall of the insulating case 63. The electrode portions of both the electrodes 61, 62 in this embodiment were formed of the No. 2 Cu base alloy listed in Example 1, and machined into the size 20 mm in diameter and 5 mm thick, followed by evaluation tests below.

Of various electric tests, the breakdown voltage test was made by breaking off AC 300 A ten times, then applying an impulse voltage while incrementing the voltage in a step of 5 kV, and measuring the discharge voltage values at the time insulation breakdown occurs between the electrodes.

The breaking performance test was made by using the electrode of being 20 mm in diameter, breaking off an AC current while incrementing it in a step of 500 A, and measuring the critical current value at which breaking-off was disabled. Further, the cut-off current test was made by breaking off a small AC current of 2 to 8A, measuring the produced cut-off current 100 times, and determining the maximum value and the mean value of the cut-off currents.

Figure 12:
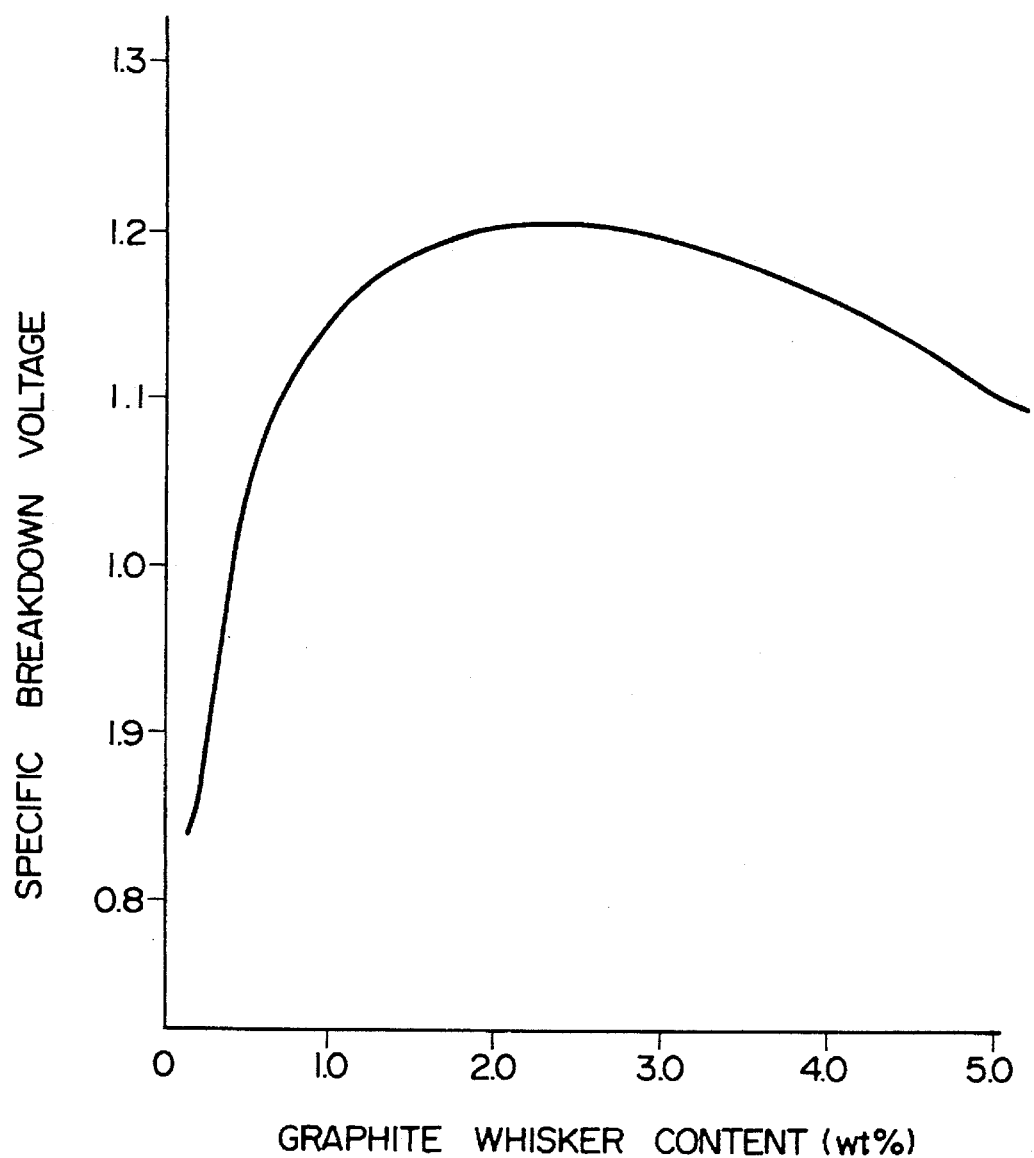
FIG. 12 is a graph showing the relationship between a graphite whisker content and a specific breakdown voltage.
Figure 13:
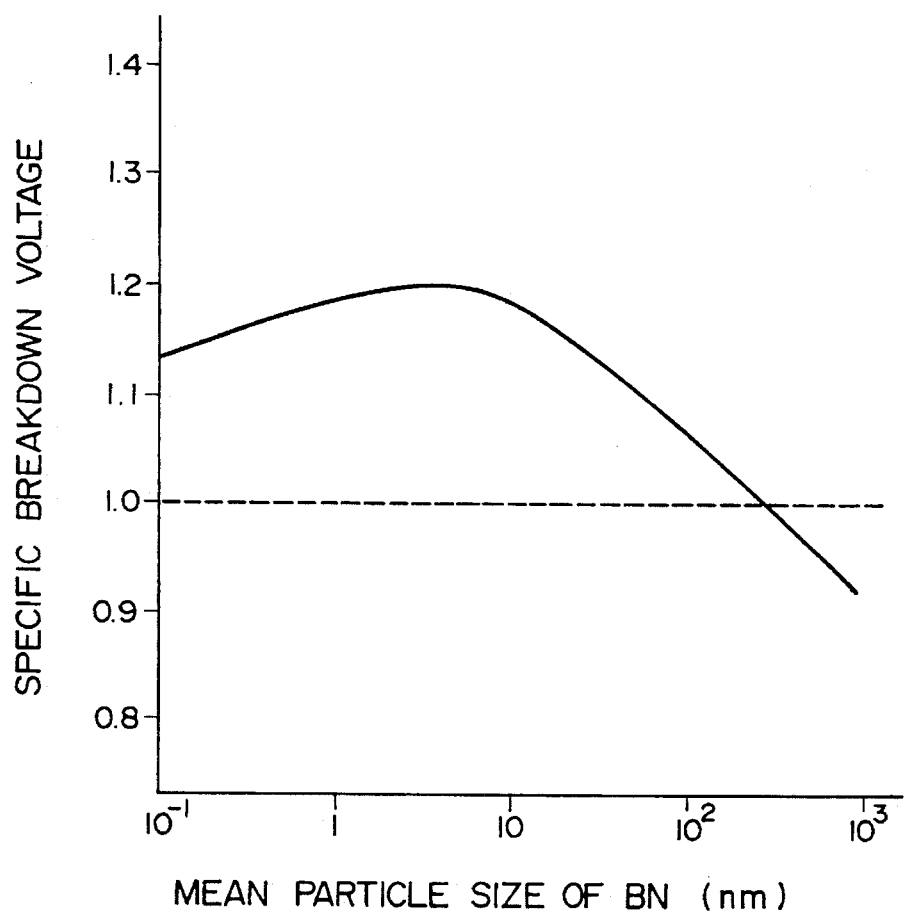
FIG. 13 is a graph showing the relationship between the mean grain size of BN particles and a specific breakdown voltage.

FIG. 12 is a graph showing measured results of breakdown voltage characteristics of the electrodes formed by the present invention, as the relationship between a specific breakdown voltage and a content of BN particles. Also, FIG. 13 is a graph showing the relationship between a specific breakdown voltage and the grain size of dispersed BN particles. The specific breakdown voltage is indicated as a relative value on the basis of a reference (1.0) corresponding to the breakdown voltage which is resulted by using a 50 wt % Cu -50 wt % Cr alloy as the typical conventional material. As will be seen, the material containing the dispersed BN particles not more than 0.2 μm exhibits the breakdown voltage in excess of that of the conventional material. Particularly, superior breakdown voltage characteristics are achieved with the dispersed BN particles being 1 to 10 nm in grain size.

EXAMPLE 7

Figure 14:
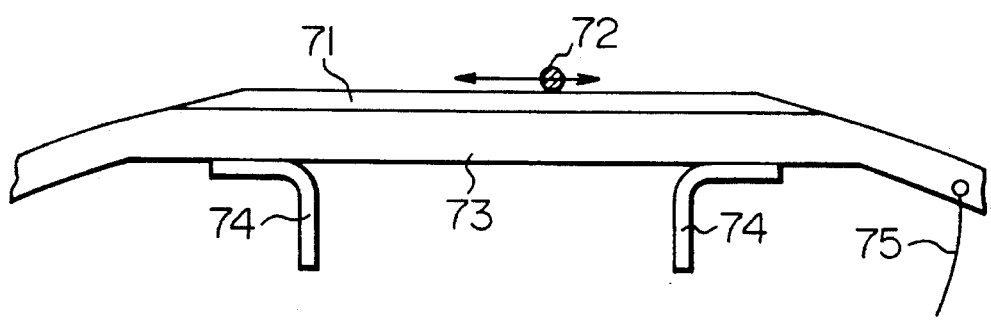
FIG. 14 is a schematic view of a pantograph.

FIG. 14 is a front view of a pantograph for railway vehicles using, as a sliding contact member, the No. 2 Cu base alloy of the present invention listed in Example 1. The pantograph is arranged such that a contact strip 71 is fixed by bolts to a body (collector shoe) 73 made of an Al alloy (duralumin base alloy), and the collector shoe 73 is fixed through insulators 74 to a mount connected to the vehicle. The collector shoe 73 is supplied with electric power through a lead wire 75. A trolley wire 72 moves to the left and right while the vehicle is traveling, so that the wire 72 will not come into slide contact with the surface of the contact strip 71 at the same position at all times.

The pantograph of this embodiment can be adapted for a tendency toward higher speeds in railways due to its high strength, high wear resistance and high electric conductivity. Thus, the pantograph is suitable for not only the current bullet trains traveling at 220 km/h, but also future bullet trains traveling a higher speed of 350 to 450 km/h.

As is described above, according to the present invention, there is provided a metallic member having high strength and high wear resistance, which is very advantageous when used as a sliding contact member in compressors and so on. Also, by using a pure metal free from any alloy elements as a base metal, the obtained metallic member has superior characteristics such as high strength, high thermal conductivity, high electric conductivity, and high wear resistance; hence it is also very advantageous when used in electrodes of vacuum circuit breakers, contact strips of pantographs, etc.

What is claimed is:

1. A ceramic-particle-dispersed metallic member in which ceramic super fine particles, and solid lubricant particles or solid lubricant short size fibers are dispersed, wherein the mean grain size of said ceramic super fine particles is not more than 200 nm, and the mean grain size of said solid lubricant particles or the mean diameter of said short size fibers is in the range of 0.25 to 10 μm.

2. A ceramic-particle-dispersed metallic member in which ceramic super fine particles, and solid lubricant particles or solid lubricant short size fibers are dispersed, wherein the mean grain size of said ceramic super fine particles is not more than 200 nm, and a region where said ceramic super fine particles are dispersed in a matrix by not less than 500 in number per section area of one square micrometer is formed substantially over the entirety region of said metallic member.

3. A ceramic-particle-dispersed metallic member in which ceramic super fine particles, and solid lubricant particles or solid lubricant short size fibers are dispersed, wherein said ceramic super fine particles have the content not more than 1 wt % and the mean grain size not more than 200 nm, and a region where said ceramic super fine particles are dispersed in a matrix by not less than 500 in number per section area of one square micrometer at 1 wt % is formed substantially over the entirety region of said metallic member.

4. A ceramic-particle-dispersed metallic member in which ceramic super fine particles, and solid lubricant particles or solid lubricant short size fibers are dispersed, wherein said ceramic super fine particles have the content not more than 1 wt % and the mean grain size not more than 200 nm, and a region where said ceramic super fine particles are dispersed in a matrix by not less than 500 in number per section area of one square micrometer is formed substantially over the entirety region of said metallic member.

5. A ceramic-particle-dispersed metallic member in which ceramic super fine particles, and solid lubricant particles or solid lubricant short size fibers are dispersed, wherein said ceramic super fine particles have the content of not more than 1 wt % in a matrix and the mean grain size not more than 200 nm, and when a relationship between the content (wt %) and the mean particle spacing (nm) of said ceramic super fine particles is plotted in a logarithmic scale, said relation- ship is distributed within the rectangular region defined by straight lines interconnecting a point A (0.01%; 20 nm), a point B (0.01%; 500 nm), a point C (1.0%; 50 nm) and a point D (1.0%; 2 nm).

6. A ceramic-particle-dispersed metallic member according to any one of claims 1 to 5, wherein said metallic member comprises a sintered material.

7. A ceramic-particle-dispersed metallic member according to any one of claims 1 to 5, wherein said metallic member comprises a member held in sliding contact with a mating number.

8. Ceramic-particle-dispersed composite metallic powder in which the ceramic super fine particles, and solid lubricant particles or solid lubricant short size fibers are embedded in metallic powder, wherein said composite metallic powder contains the particles not less than 40 wt % of which grain size is not less than 60 μm and wherein said ceramic super fine particles have a mean grain size of not more than 200 nm and a region where said ceramic super fine particles are dispersed in the matrix of each particle of said composite metallic powder by not less than 500 in number per section area of one square micrometer is formed substantially over the entirety region of said metallic powder sliding contact with a mating member.

9. A ceramic-particle-dispersed metallic member according to any one of claims 2 to 5, wherein said metallic member comprises powder.

10. A method of manufacturing a ceramic-particle-dispersed metallic member wherein said metallic powder in which ceramic super fine particles, and solid lubricant particles or solid lubricant short size fibers are embedded, according to claim 9, is sintered at a high temperature under a pressure.

11. A compressor comprising a sliding member, a wobble plate fixed to a rotary shaft and a piston reciprocally moving through the sliding member with rotation of said wobble plate, wherein said sliding member is made of a copper base sintered alloy in which ceramic super fine particles, and solid lubricant particles or solid lubricant short size fibers are dispersed and wherein said ceramic super fine particles have a mean grain size of not more than 200 nm and a region where said ceramic super fine particles are dispersed in a matrix of said copper base sintered alloy by not less than 500 in number per section area of one square micrometer is formed substantially over the entirety region of said member.

12. A ceramic-particle-dispersed metallic member according to claim 2, wherein said ceramic superfine particles comprise particles made of at least one material selected from the group consisting of oxide, nitride, carbide and boride and wherein solid lubricant short size fibers are dispersed in a matrix, said solid lubricant short size fibers being selected from the group consisting of graphite whiskers and carbon fibers.

13. A ceramic-particle-dispersed metallic member according to claim 12, wherein said ceramic superfine particles comprise oxide particles and wherein said solid lubricant short size fibers comprise graphite whiskers.

14. A method of manufacturing a ceramic-particle-dispersed metallic member according to claim 10, wherein said ceramic superfine particles comprise particles made of at least one material selected from the group consisting of oxide, nitride, carbide and boride and wherein solid lubricant short size fibers are dispersed, said solid lubricant short size fibers being selected from the group consisting of graphite whiskers and carbon fibers.

15. A method of manufacturing a ceramic-particle-dispersed metallic member according to claim 14, wherein said ceramic superfine particles comprise oxide particles and wherein said solid lubricant short size fibers comprise graphite whiskers.

16. A compressor according to claim 11, wherein said ceramic superfine particles comprise particles made of at least one material selected from the group consisting of oxide, nitride, carbide and boride and wherein solid lubricant short size fibers are dispersed, said solid lubricant short size fibers being selected from the group consisting of graphite whiskers and carbon fibers.

17. A compressor according to claim 16, wherein said ceramic superfine particles comprise oxide particles and wherein said solid lubricant short size fibers comprise graphite whiskers.

18. A ceramic-particle-dispersed metallic member according to claim 2, wherein the matrix of the metallic member consists of copper, aluminum, iron or an alloy containing copper, aluminum or iron as a primary alloying element and said metallic member comprises a sintered material.

* * * * *